(12) United States Patent
Liao et al.

(10) Patent No.: US 10,243,382 B2
(45) Date of Patent: Mar. 26, 2019

(54) CAR JUMP STARTER POWER BANK AND BATTERY PACK CONNECTING METHOD THEREOF

(71) Applicant: Dongguan Juxing Power Co., Ltd, Dongguan (CN)

(72) Inventors: Yuefei Liao, Dongguan (CN); Jixiang Xie, Dongguan (CN); Xiong Li, Dongguan (CN); Dewen Ma, Dongguan (CN)

(73) Assignee: Dongguan Juxing Power Co., Ltd, Dongguan (CN)

( * ) Notice: Subject to any disclaimer, the term of this patent is extended or adjusted under 35 U.S.C. 154(b) by 0 days.

(21) Appl. No.: 15/638,353

(22) Filed: Jun. 29, 2017

(65) Prior Publication Data

US 2018/0337544 A1 Nov. 22, 2018

(30) Foreign Application Priority Data

| May 19, 2017 | (CN) | .......................... 2017 1 0362777 |
| May 19, 2017 | (CN) | .......................... 2017 1 0362778 |
| May 23, 2017 | (CN) | .......................... 2017 1 0375892 |

(51) Int. Cl.
*H02J 7/00* (2006.01)
*H02J 7/34* (2006.01)
(Continued)

(52) U.S. Cl.
CPC ......... *H02J 7/0054* (2013.01); *B60L 11/1816* (2013.01); *H01M 4/02* (2013.01);
(Continued)

(58) Field of Classification Search
None
See application file for complete search history.

(56) References Cited

U.S. PATENT DOCUMENTS

| 7,199,555 B2 * | 4/2007 | Hung | .................... H02J 7/0054 320/114 |
| 7,232,105 B2 * | 6/2007 | Want | .................... A61G 7/0503 128/DIG. 24 |

(Continued)

FOREIGN PATENT DOCUMENTS

CN 204204977 U 11/2014

*Primary Examiner* — Lucas J. O'Donnell
(74) *Attorney, Agent, or Firm* — Timothy T. Wang; Ni, Wang & Massand, PLLC

(57) ABSTRACT

A car jump starter power bank includes its shell, control circuit, battery pack, charging circuit and ignition circuit with an ignition interface, there is an electric quantity indication module on the shell, the electric quantity indication module is an LED indicator or LCD display, the charging circuit is used for charging the battery pack, the ignition circuit is used for power output for the ignition of the automobile, the positive and negative electrodes of the battery pack are connected with two output wires through two connection straps, and the two output wires are connected with the ignition interface, electrodes of neighboring single batteries are welded by high-frequency pulses, there are insulating strips that separate electrodes between neighboring single batteries. The structure of such battery pack and car jump starter power bank is quite simple and easy to implement with stable quality.

6 Claims, 15 Drawing Sheets

(51) Int. Cl.
  *B60L 11/18*   (2006.01)
  *H01M 4/02*   (2006.01)
  *H02J 1/00*   (2006.01)

(52) U.S. Cl.
  CPC ........... *H02J 7/345* (2013.01); *B60L 2210/10* (2013.01); *H01M 2004/027* (2013.01); *H01M 2004/028* (2013.01); *H02J 2001/006* (2013.01)

(56) References Cited

U.S. PATENT DOCUMENTS

| | | | |
|---|---|---|---|
| 9,506,446 B2 | 11/2016 | Liu | |
| 9,578,938 B1 * | 2/2017 | Verneuille | A45C 5/06 |
| 2003/0146734 A1 * | 8/2003 | Kozu | H01M 2/021 |
| | | | 320/107 |
| 2015/0054336 A1 * | 2/2015 | Xinfang | B60R 16/033 |
| | | | 307/9.1 |
| 2015/0072202 A1 * | 3/2015 | Li | H01G 11/12 |
| | | | 429/94 |

\* cited by examiner

CAR JUMP STARTER POWER BANK AND BATTERY PACK CONNECTING METHOD THEREOF

BACKGROUND

The instant disclosure relates to a way to connect a car jump starter power bank and the battery pack and the battery pack in the jump starter power bank.

When a battery is shipped out of the factory, there are electrodes on the end. When a battery is used, the electrodes need to be connected with external wires, or a number of batteries need to be connected in a series-parallel manner to form a battery pack and then welded with external wires. It thus involves the welding of battery electrodes.

For a battery commonly used today, the way to weld its electrodes and weld its electrodes with external circuits is done with electric soldering irons and soldering tin. The biggest problem of this way of welding is that the welding will take a long time. During the operation, the electric soldering iron will produce high temperature to melt the soldering tin, which in turn contacts the electrode. By bridging the soldering tin, a substantial amount of the heat produced by the electric soldering iron will be passed onto the electrode. Then the heat is transmitted inside the battery through the electrode. In this case, the battery has to bear the high-temperature transmission during the welding with the soldering iron, which is quite likely to harm the battery from inside. Especially, battery materials around the electrode being welded are significantly affected, which will reduce the life of the battery and thus affect the performance of the whole product (such as the car jump starter power bank, etc.).

Besides, this way of welding with soldering tin is extremely inefficient, likely to cause dry joints, which may affect the quality of the product. Besides, by welding with soldering tin, the connection between different electrodes or between electrodes and wires and other components is made through soldering tin. It may result in large resistance. The heat produced by large contact resistance is likely to further damage the electrical machine or even the battery, causing substantial hidden risks.

It is hard to operate in the conventional soldering tin process, which needs skilled operators. Any improper operation would cause high-temperature harm on the battery (the beat is produced by the soldering iron and is transmitted through the electrode).

Besides, in existing technologies, there is also a method for the connection of electrodes with rivets. See "A Kind of Lithium-ion Battery Pack" (Chinese patent publication No.: CN 204204977 U; application No.: 201420736383.4). In this patent, electrodes are connected with rivets, while electrodes and output wires are also connected with each other with rivets. Though this method has solved the problem that the cell suffers high temperature, it involves complex techniques—through-holes and rivet parts are needed, resulting in high cost and low efficiency. It is thus not suitable for extensive use.

Therefore, a car jump starter power bank and battery pack connecting method thereof has been disclosed.

SUMMARY

In one embodiment a car jump starter power bank, comprising a shell, a control circuit disposed within the shell, wherein the control circuit controls a charging process, a battery pack disposed within the shell wherein the battery pack has a plurality of series-wound batteries, each battery having a positive battery electrode and a negative battery electrode, a charging circuit disposed within the shell, wherein the charging circuit charges the battery pack, an ignition circuit having an ignition interface disposed within the shell, the ignition circuit powers an ignition output of an automobile, an electric quantity indication module on the shell wherein the electric quantity indication module is one of an LED indicator and an LCD display, a positive battery pack electrode is connected to a positive output wire through a positive connection strap to the ignition interface, wherein the positive battery pack electrode is welded by high-frequency pulses to the batteries, a negative battery pack electrode is connected to a negative output wire through a negative connection strap to the ignition interface, wherein the negative battery pack electrode is welded by high-frequency pulses to the batteries, a plurality of connection straps connecting the batteries, wherein the plurality of connection straps are welded by high-frequency pulses to the batteries and a plurality of insulating strips are pasted to the batteries and separate the positive battery electrode and the negative battery electrode.

In another embodiment a method of connecting a battery pack in a car jump starter power bank having rechargeable batteries, comprising welding by high-frequency pulses a connection strap to an electrode of at least one of the rechargeable batteries and welding by high-frequency pulses an output wire to another electrode of at least one of the rechargeable batteries.

Figure 1:
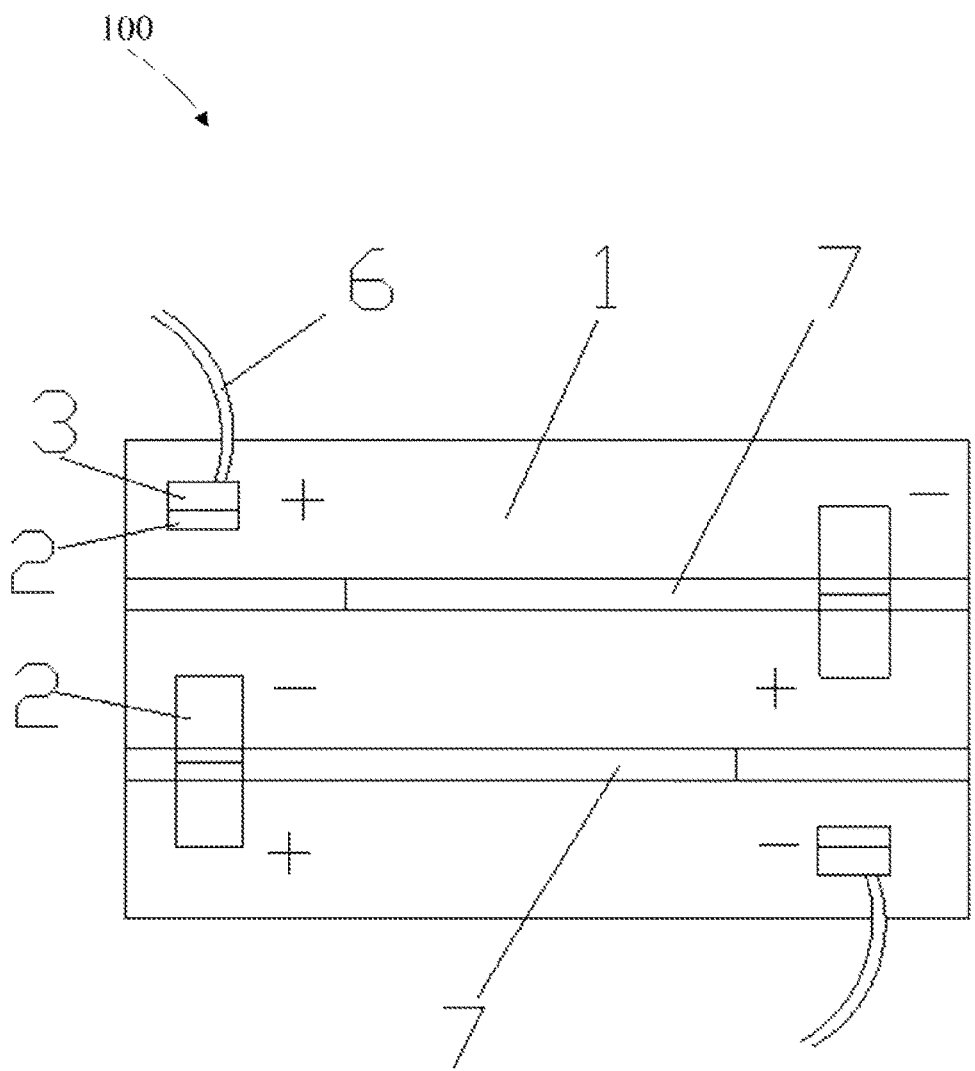
FIG. 1 is a depiction of the welding of the battery pack.

Numbering: 1—single battery, 2—electrode, 3—connection strap, 4—welding point, 5—wire metal end, 6—output wire, and 7—insulation strip.

11—shell, 12—electric quantity indicator, 13—first bottom, 14—USB interface, 15—charging end, 16—second button, 17—ignition end cap, 18—strip light, 19—suspension loop, and 20—front-end LED lamp; 21—hook, 22—hinge joint part, and 23—clear sunk part.

DETAILED DESCRIPTION

A car jump starter power bank and battery pack connecting method thereof is disclosed with the following advantages:

(1) It only takes a short time for welding. The output wires are welded with the nickel straps with soldering tin, and the nickel straps are then welded with the electrodes with high-frequency pulses. As it takes little time for high-frequency butt-joint, usually only 1 to 2 seconds, and such way of welding will not produce high temperature, the batteries will not suffer high temperature and any damages therefrom, so that the yield rate of the products can be enhanced.

(2) High-frequency welding is highly reliable, which can effectively avoid dry joints guarantee welding quality, with small internal welding resistance and good stability. It is good for the stable work of the battery pack.

(3) In this disclosure, the connectors for the battery pack are highly efficient in connection, and the efficiency is significantly enhanced compared to manual electric soldering iron welding and riveting.

In a word, this kind of battery pack and car jump starter power bank is easy to implement with high reliability, which can avoid any harm to the batteries and achieve high efficiency, and is suitable for promotion and implementation.

Besides, the constant current charging circuit in this disclosure is a brand-new constant current realization method. Its core is to realize constant current by a constant voltage chip. Besides, the magnitude of the output current can be set quite flexibly. It is more effective in application compared to constant current chips adopted before. It is proved by practice that, the charging circuit in this disclosure is quite effective in the control of the charging circuit, which helps reduce the cost.

The car jump starter power bank in this disclosure has the following characteristics:

(1) It has a hook, which can prevent surface high temperature produced by the engine of the car from being transmitted to the product and block high-temperature conduction. The hook can rotate by 360 degrees to be adaptable to suspension in different directions. The suspension is also combined with lighting and other functions. When the car is being fixed or in any other occasion where stable lighting is required, the hook can help hang and fix the lighting device, and it is easy to change the direction. Besides, the hook can be folded and then put into the clear sunk part, so that it will not affect the overall beauty of the car jump starter power bank.

Based on the previous car jump starter power bank, a suspension hook is added in this disclosure, and high-temperature conduction is blocked, so that the life of the batteries will not be affected;

(2) With a suspension loop.

With the suspension loop, the user can fix the car jump starter power bank near the storage battery with a rope or anything else, so that the car can still drive more than ten kilometers with sustained power supply in case the storage battery or power generator of the car fails.

(3) The strip light can be used as a lighting lamp or an indicator light; a red-blue flashing alarm lamp is added to the product, and a flap where light can penetrate covers the product, which can be used as an alarm lamp in case the car malfunctions at night. There is also a white LED lamp in the strip light that provides lighting. When the storage battery of the car is out of electricity or the car is out of order at night, the lamp can be used as an alarm lamp to avoid any traffic accident.

(4) Light Regulation

The product is equipped with the light regulation function, for the regulation of the luminance of light (the strip light and the front-end LED lamp). Besides, the product adopts an MOS tube and uses PWM for light regulation. The circuit is easy to make, and the cost is lower than that of a specialized constant current chip.

(5) Besides, there is an automatic charging identification function integrated in the car jump starter power bank, and an integrated circuit that can automatically identify charging current is added to the USB output interface.

To sum up, this kind of car jump starter power bank boasts abundant functions and a high degree of integration, and it is easy to use. Thus, it is a unique product and is adaptable to promotion and implementation.

SPECIFIC EMBODIMENT METHODS

The disclosure is further described in detail according to the attached figures and specific modes of execution as follows:

Implementation 1: See FIG. 1 to FIG. 4. This is a battery pack welded with high-frequency pulse.

The battery pack includes multiple single batteries, each of which has two electrodes;

Positive and negative electrodes of the battery pack are connected with two output wires through two connection straps;

Electrodes of neighboring single batteries are welded by high-frequency pulses.

There are connection straps welded or pressed on the output wires, and the connection straps and the positive electrodes as well as the connection straps and the negative electrodes are welded by high-frequency pulses.

The connection straps are made of alloy or nickel.

The connection straps and the output wires are welded with soldering tin.

There are insulating strips that separate electrodes between neighboring single batteries.

The insulating strips are soft insulating strips.

The insulating strips are pasted between neighboring single batteries.

The battery pack is also connected with a constant current charging circuit.

This is a kind of car jump starter power bank, including the battery pack.

The battery pack is comprised of multiple single batteries in series. It is usually comprised of 3-5 batteries in series.

Figure 2:
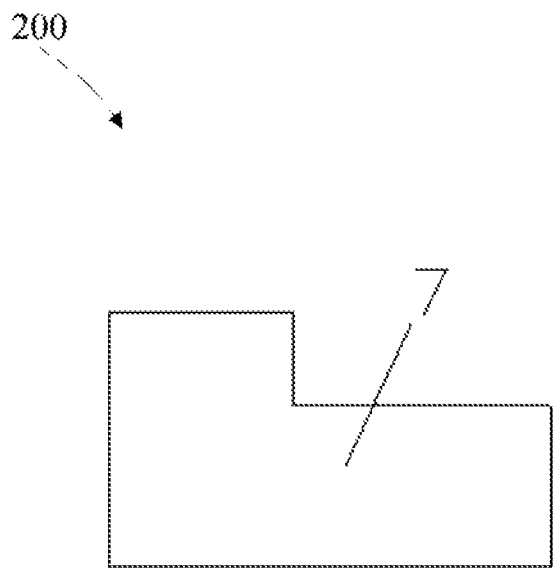
FIG. 2 is a depiction of the structure of the insulation strip.

See FIG. 2. The insulating strip is L-shape. The vertical obtrusive part blocks the electrode to avoid short circuits of the electrode. There is adhesive on the horizontal part, which is used to stick neighboring batteries together for fixing.

Figure 3:
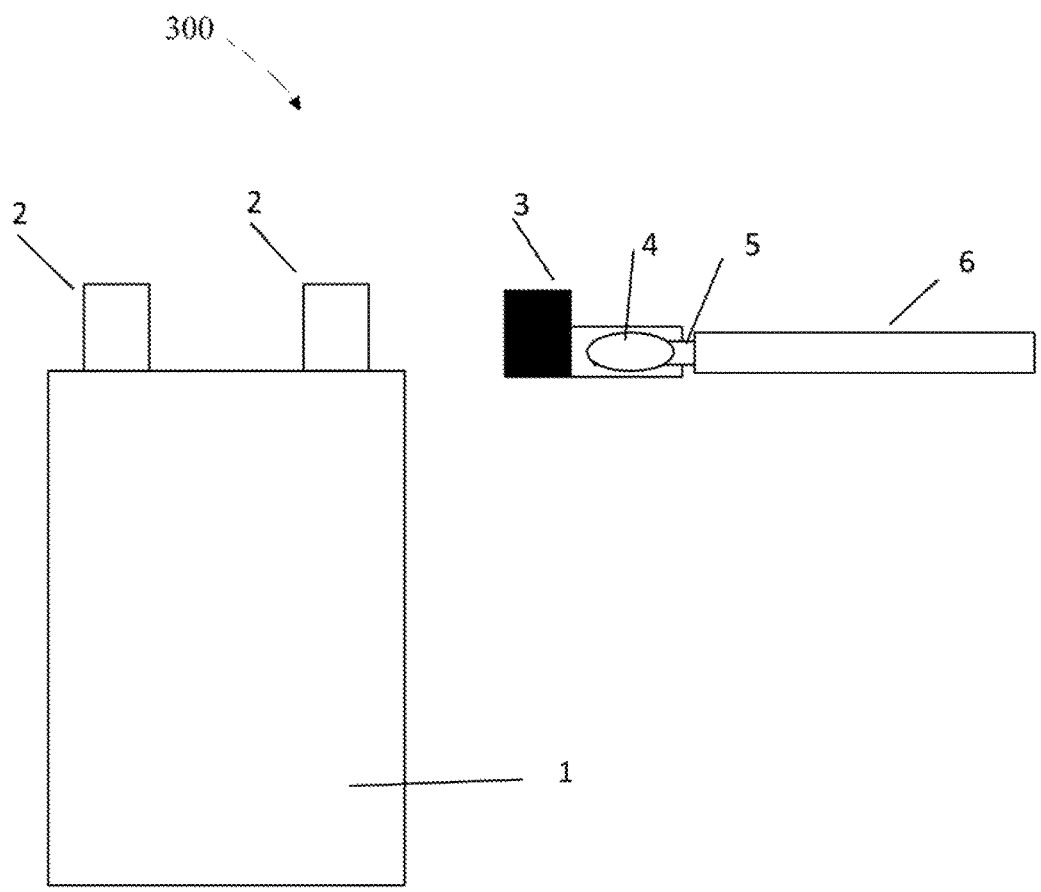
FIG. 3 is a depiction before the output wires are welded to the electrodes.
Figure 4:
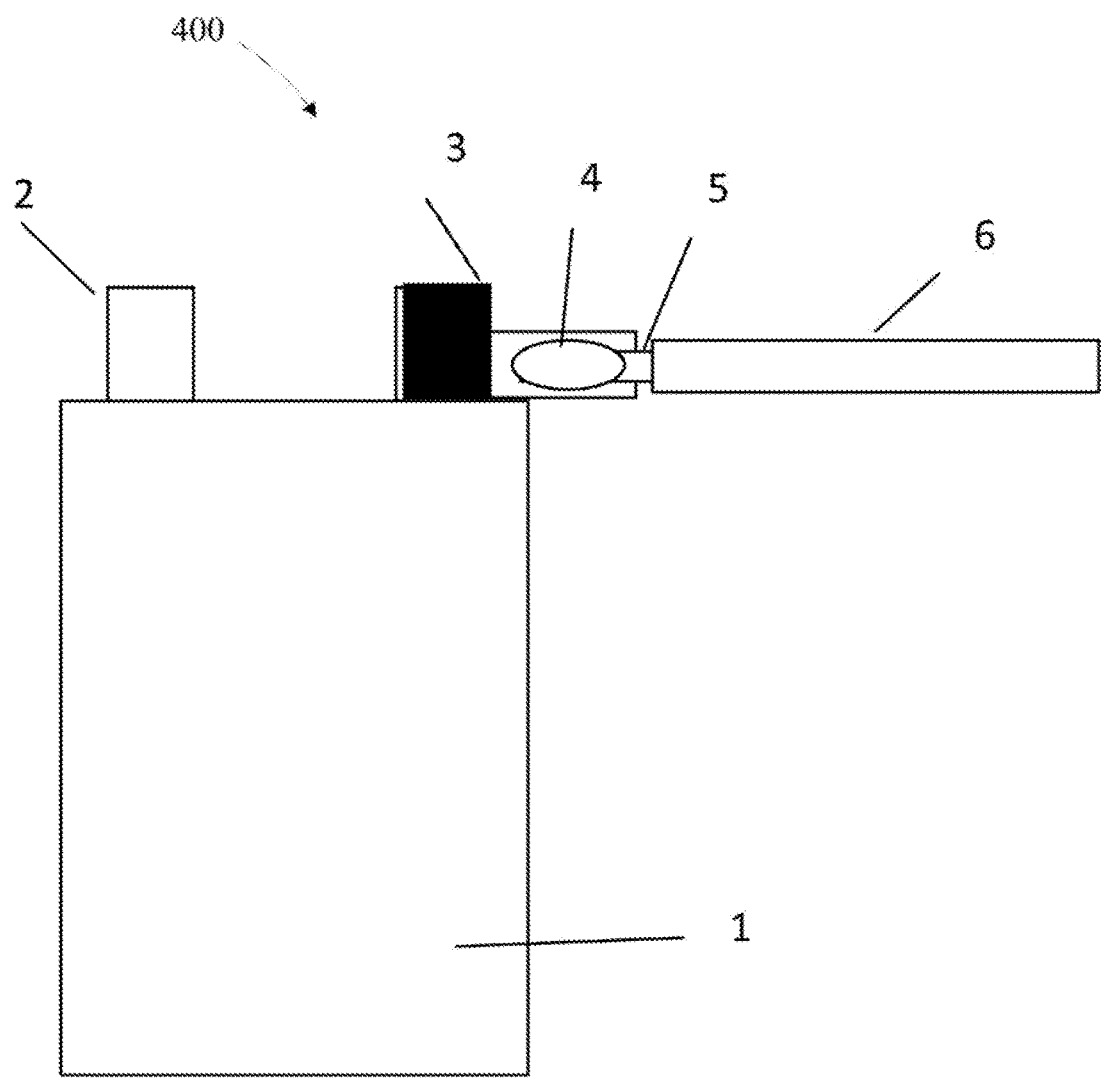
FIG. 4 is a depiction after the output wires are welded to the electrodes.

See FIG. 3 to FIG. 4. The welding steps are as follows:

1. Peel the wire to reveal a metal end of about 2 mm to 20 mm;

2. Connect the connection strap (made in nickel or alloy, for example) and the metal end, and weld them with an electric soldering iron and soldering tin;

3. Overlap the other end of the connection strap with the electrode;

3. Weld the electrode to the connection strap with a pulse metal spot welding jig (high-frequency pulse welding device).

In Step2, we may also directly press the end of the wire to a connection strap as a metal end, and then weld the connection strap to the electrode by high-frequency pulses.

Figure 5:
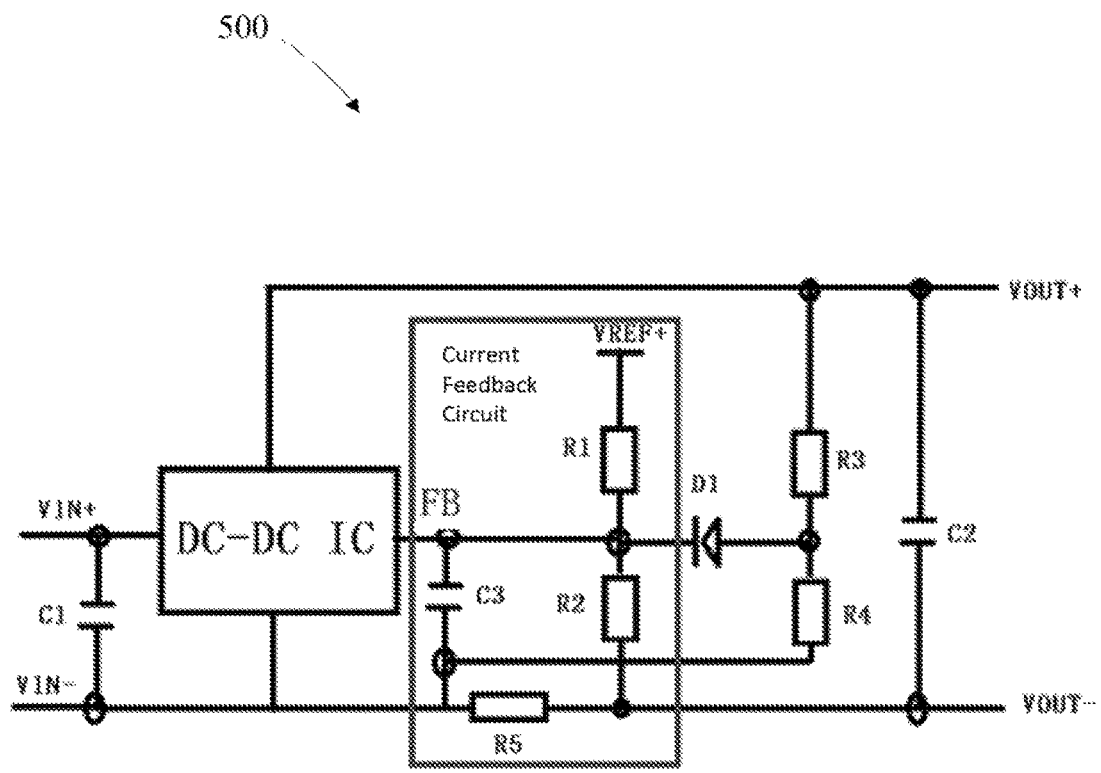
FIG. 5 is a depiction of the constant current circuit.
Figure 6:
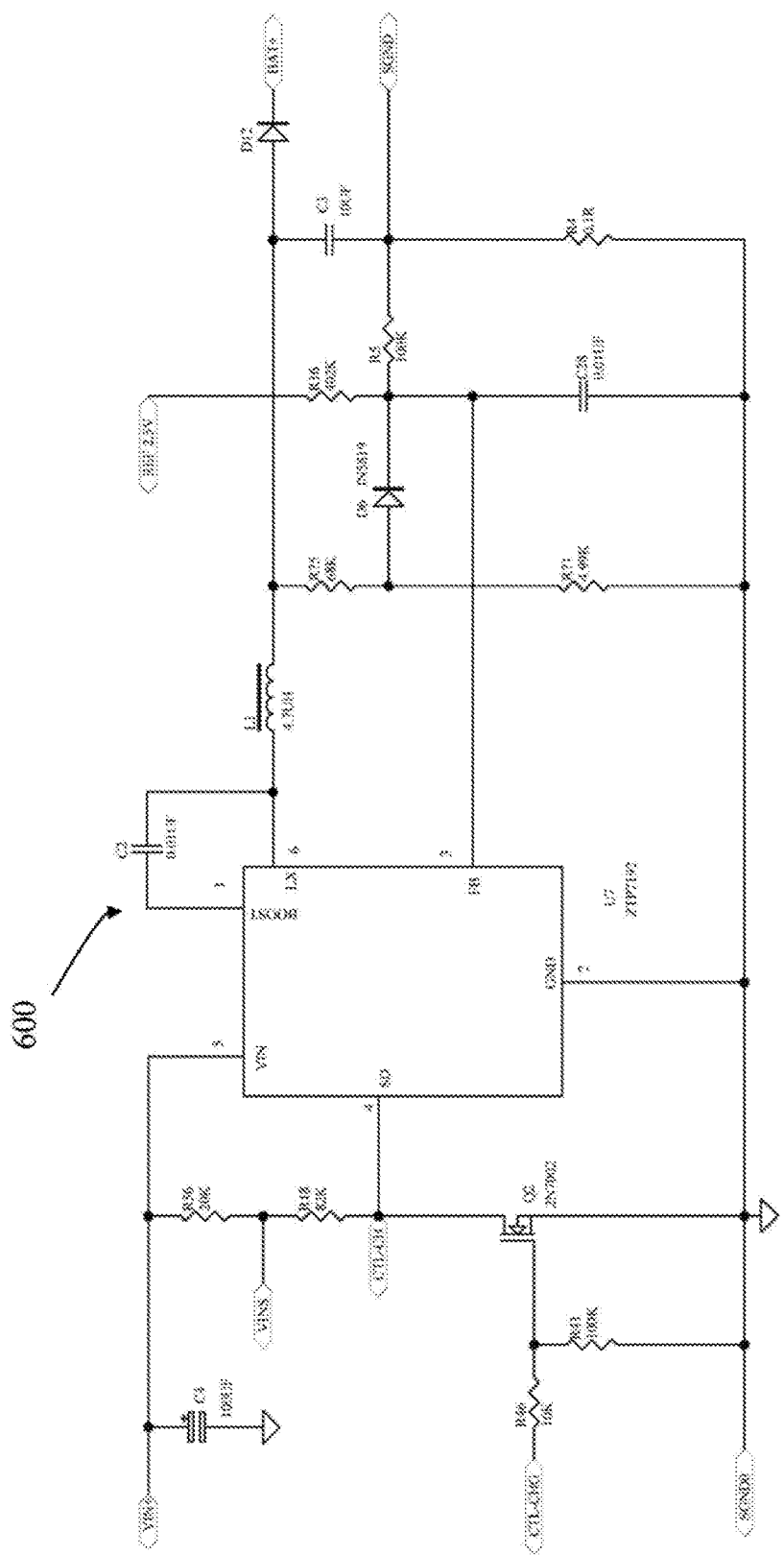
FIG. 6 is a schematic diagram for the constant current circuit.
Figure 7:
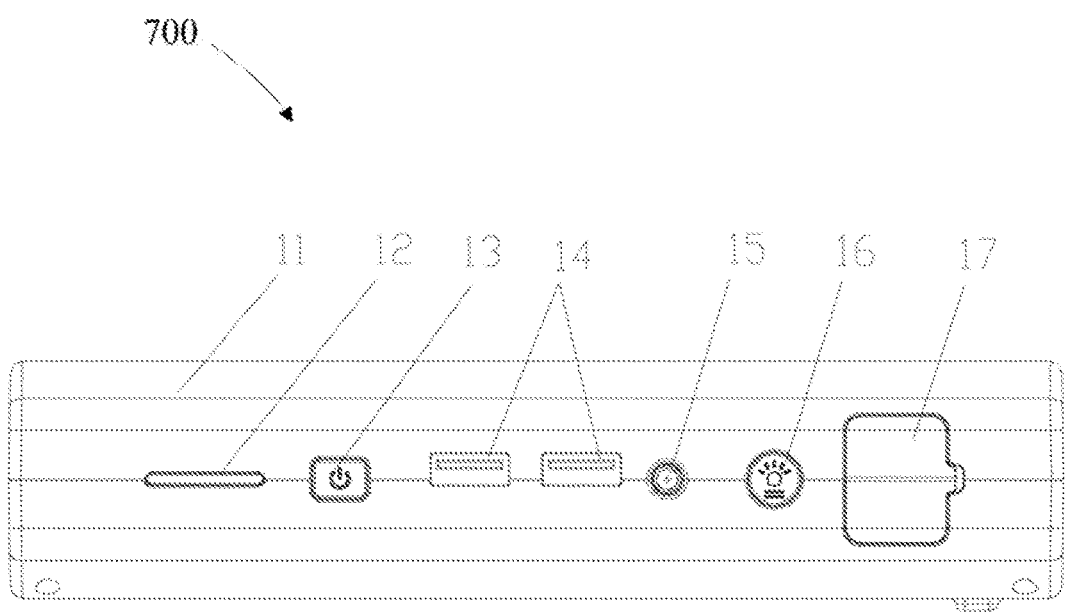
FIG. 7 is a depiction of the bottom interface of the jump starter power bank.
Figure 8:
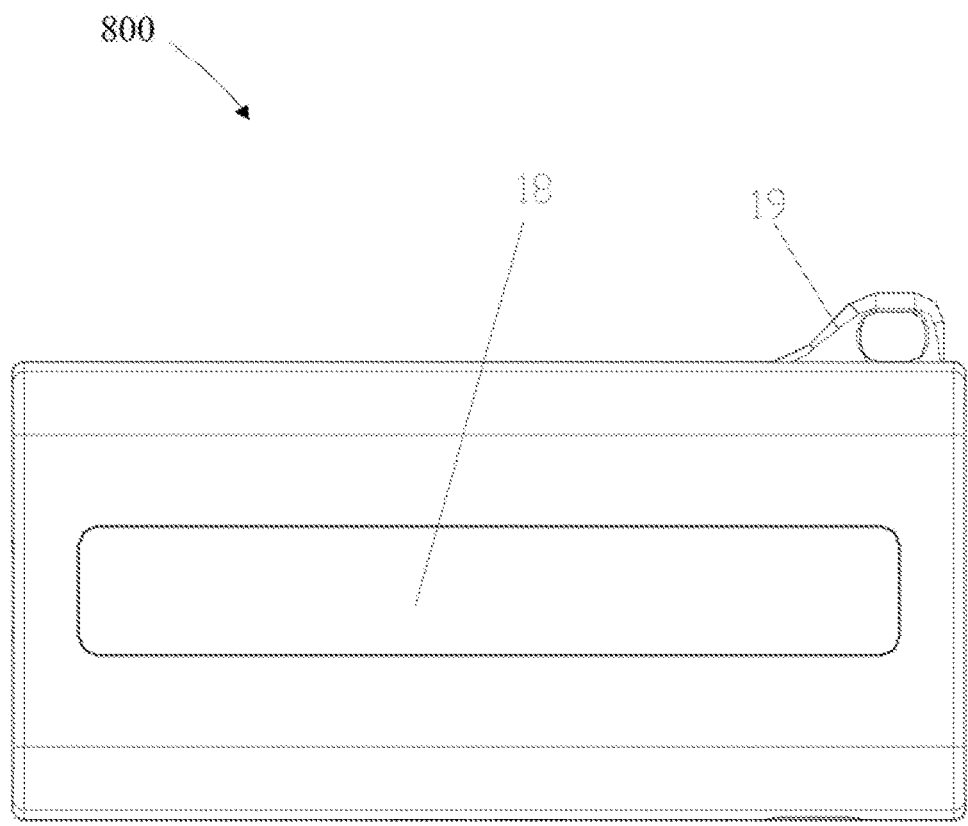
FIG. 8 is a depiction of the structural front of the jump starter power bank.
Figure 9:
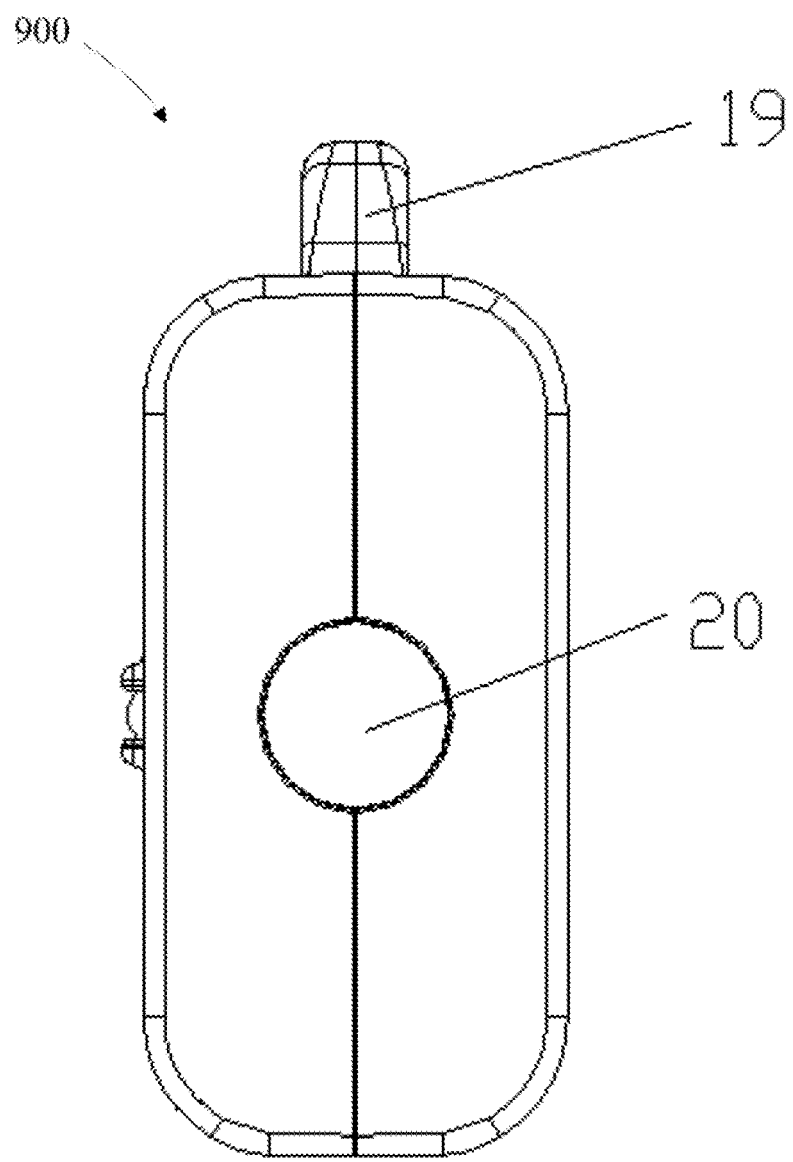
FIG. 9 is a depiction of the front face of the jump starter power bank.
Figure 10:
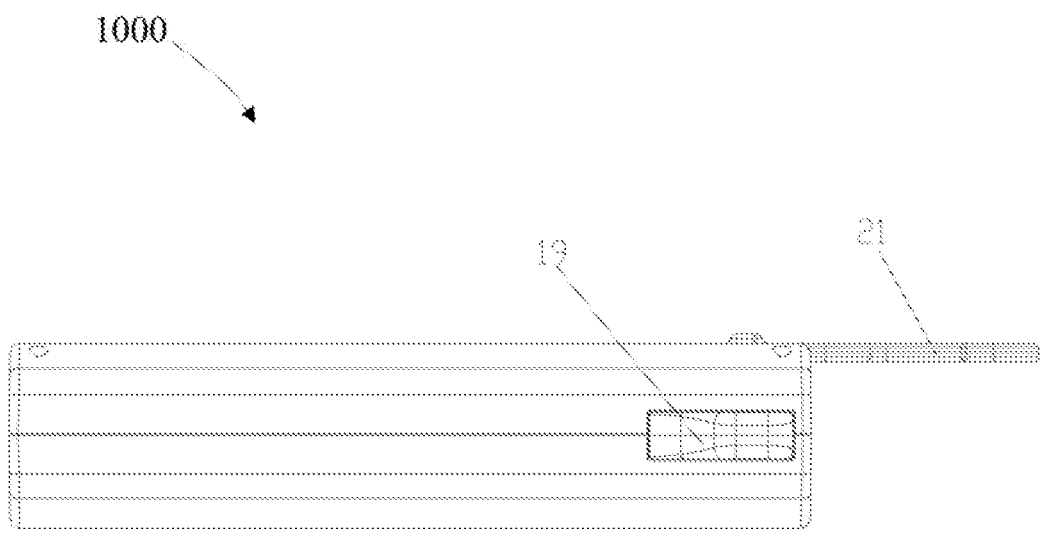
FIG. 10 is a depiction of the top of the jump starter power bank (when the hook is unfolded)
Figure 11:
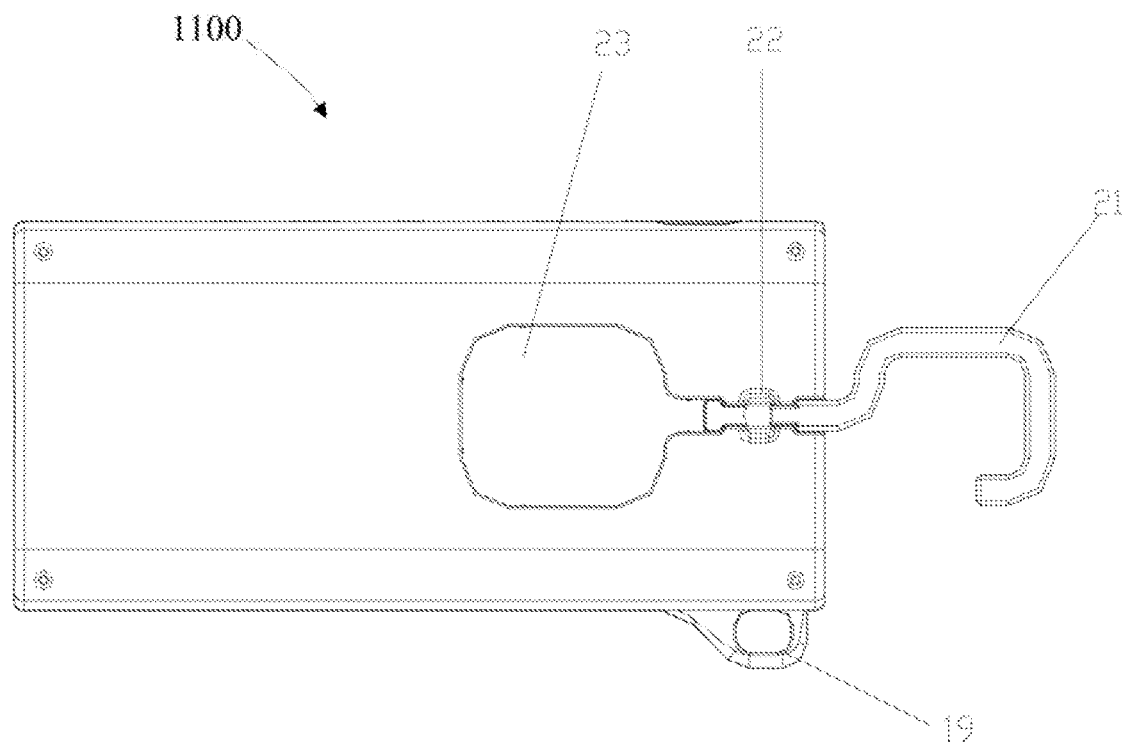
FIG. 11 is a depiction of the back of the jump starter power bank (when the hook is unfolded)
Figure 12:
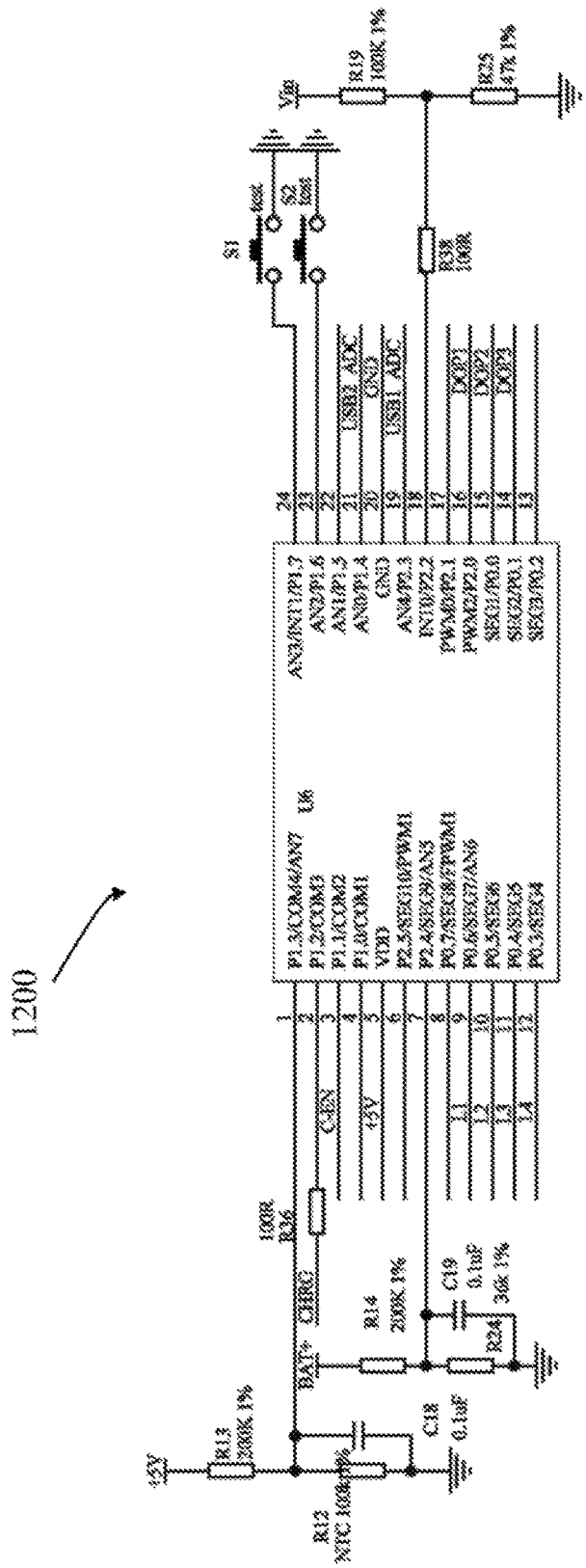
FIG. 12 is a schematic diagram for part of the MCU circuits.
Figure 13:
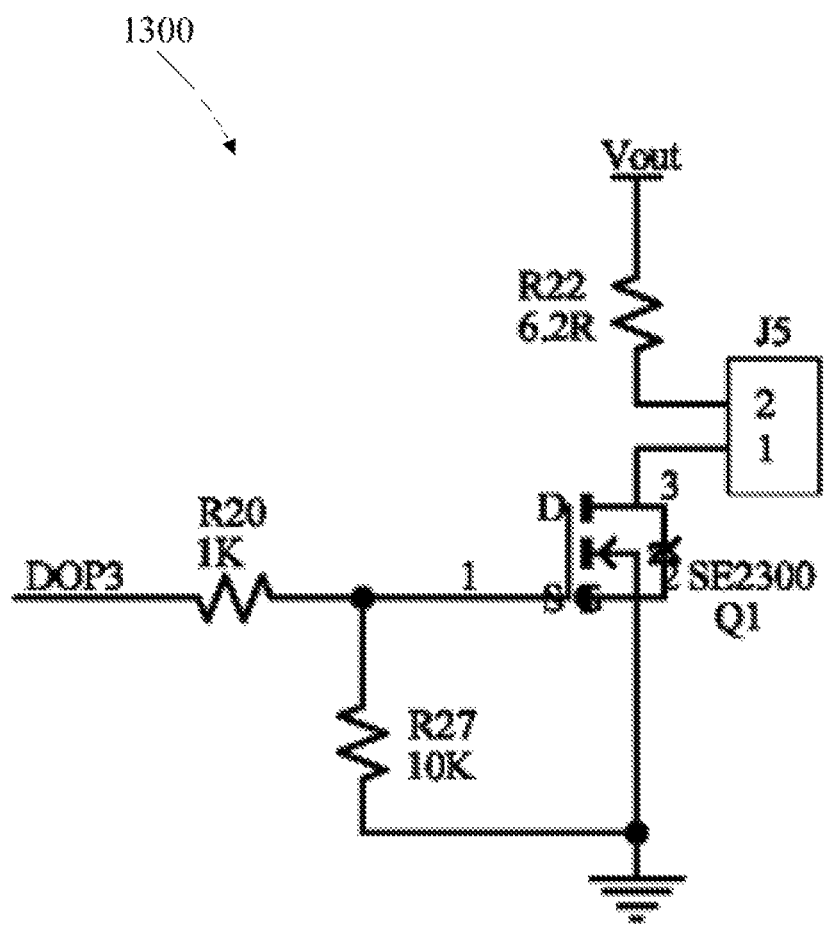
FIG. 13 is a schematic diagram for the light regulation circuit.
Figure 14:
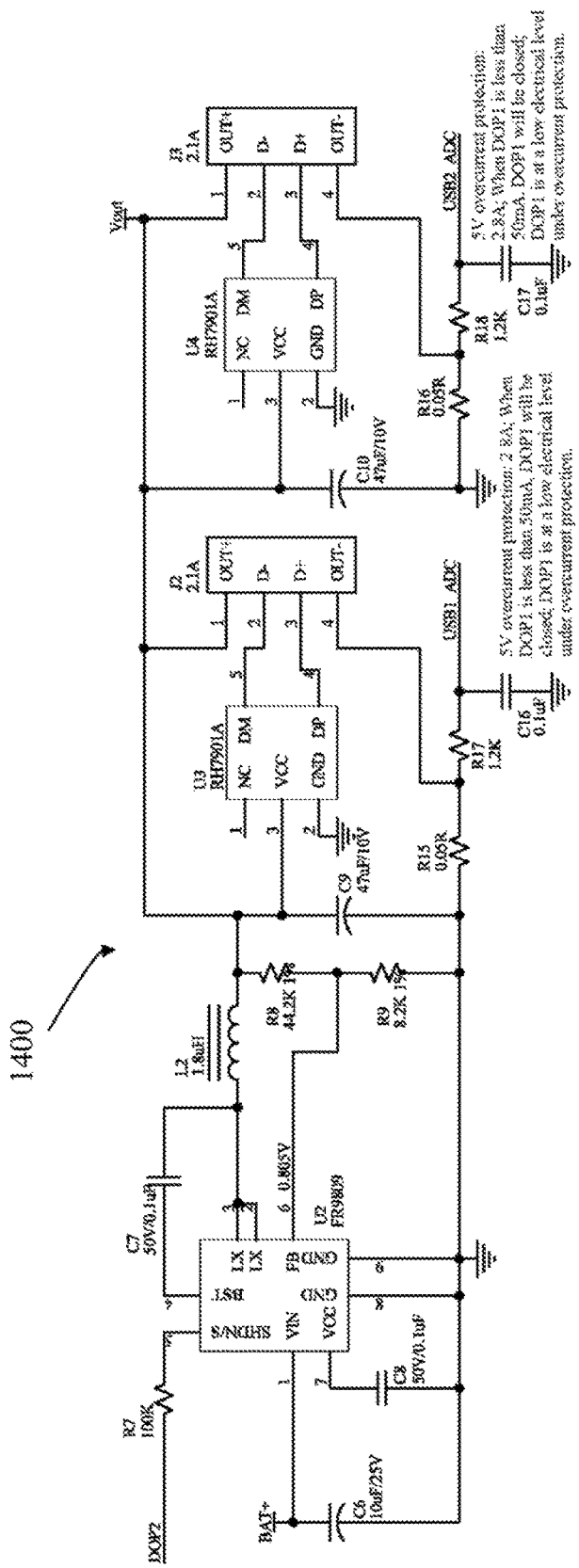
FIG. 14 is a schematic diagram for the USB charging circuit.
Figure 15:
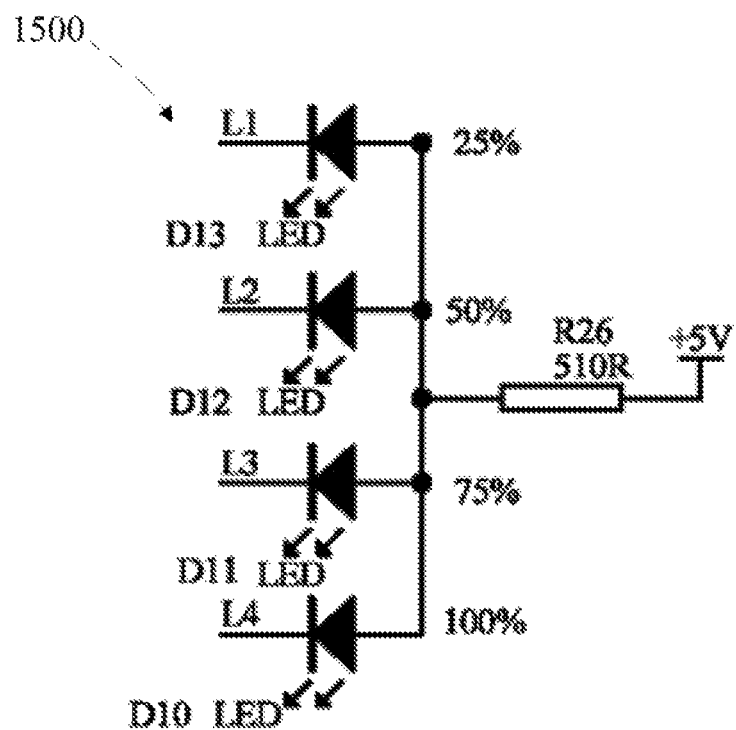
FIG. 15 is a schematic diagram for the electric quantity indicator circuit.

See FIG. 5 to FIG. 6. A description about each pan or number in a constant current charging circuit is as follows:

VIN+—Positive electrode of the input power supply
VIN− Negative electrode of the input power supply
VOUT+—Positive electrode of the output power supply
VOUT−—Negative electrode of the output power supply
VREF+—Positive electrode of the reference power supply C1 is the input filter capacitor.
C2 is the output filter capacitor.
C3 is the current sampling feedback smoothing.
R1, R2, R5 and C3 consist of a current sampling feedback circuit.
R3 and R4 consist of a voltage sampling feedback circuit.
D1 is an isolating diode.

The constant current charging circuit includes a constant voltage driver chip and a current feedback circuit;

(1) The voltage output end of the constant voltage driver chip is the positive output end VOUT+ of the constant current charging circuit; the negative output end of the constant voltage driver chip is earthed;

Power for the constant voltage driver chip is supplied by the direct current voltage power supply ends VIN+ and VIN−;

(2) The current feedback circuit includes R1, R2 and R5 as well as a reference voltage end VREF+;

The reference voltage end VREF+ is earthed through R1, R2 and R5 that are in series one by one;

The connection point between resistors R5 and R2 is the negative output end VOUT− of the constant current charging circuit;

The connection point between R1 and R2 is connected to the feedback end FB of the constant voltage driver chip.

The constant current charging circuit also includes a voltage feedback circuit;

The voltage feedback circuit includes resistors R3 and R4 as well as a diode D1;

The resistors R3 and R4 in series are connected between the negative output end VOUT+ of the constant current charging circuit and the ground; the connection point between resistors R3 and R4 is connected to the positive electrode of diode D1; the negative electrode of diode D1 is connected with the feedback end FB of the constant voltage driver chip.

Working Principle

It adopts a stable reference power supply as the benchmark voltage, and uses R1, R2 and R5 voltage division to gain a voltage that equals that at FB, so that the internal PWM of DCDC IC can be regulated by FB for the control of the magnitude of the current. For instance, when the output current increases, the voltage on sampling resistor R5 will increase accordingly. As VRFE+ is a fixed value, when FB voltage increases, FB increases, and the duty cycle thus decreases and the output current decreases. A full feedback is thus completed for stabilizing current output.

Formula for the calculation of constant current:

If the voltage produced by the current on R is VIo and the output current is Io, The reference voltage is VREF+=2.5V,
The FB voltage is VFB=0.6V,
R5=0.1Ω, R1=40KΩ, R2=10KΩ
Then:
VIo=Io*R5
VFB=VIo+((VREF+−VIo)*R2/(R1+R2))

Result:
Io=(VFB*(R1+R2)−R2*VREF+)/R1*R5
If K=(VFB*(R1+R2)−R2*VREF+)/R1, then
Io=K/R5

According to the formula, Io output current has nothing to do with the output voltage and the input voltage; instead, it is only related to VFB, R1, R2 and VREF, while these parameters are fixed in a specific design (VFB is fixed in a steady state, and its steady-state value is 0.6 v for an fp7192 constant voltage chip). Thus, K must be a fixed value, and then the "Io=K/R5" has very good linearity and good controllability.

If the foregoing parameters are assigned with the foregoing specific values, then:

$$Io = (VFB^*(R1 + R2) - R2^* VREF+)/R1^*R5$$
$$= (0.6^*(40 + 10) \sim 10^*2.5)/40^*0.1$$
$$= 1.25\ A$$

According to the foregoing equation, a fixed VREF+ is introduced in this program, so that Io becomes an equation that only has a linear relation with R5 sampling resistor, so that Io becomes constant for the purpose of constant current.

The constant current circuit in this program is characterized by:

1. A stable and fixed VREF+ voltage is used, which is favorable for the control of precision and stability.
2. The current sampling is changed into resistance voltage division feedback when the device is used, which is more simple and reliable.
3. It is widely adaptable, and can be adopted in any circuit that requires constant current.
4. The cost is reduced significantly to ⅓ of an IC constant current program.

See FIG. 7 to FIG. 15. This is a kind of car jump starter power bank, including its shell, control circuit, battery pack, charging circuit and ignition circuit with an ignition interface;

The control circuit, battery pack, charging circuit and ignition circuit are inside the shell; there is an electric quantity indication module on the shell; the electric quantity indication module is an LED indicator or LCD display;

The charging circuit is used for charging the battery pack;
The ignition circuit is used for power output for the ignition of the automobile;
The control circuit is used for controlling the charging process;
The battery pack includes a number of series-wound single batteries, each of which has two electrodes;
Positive and negative electrodes of the battery pack are connected with two output wires through two connection straps, and the two output wires are connected with the ignition interface;
Electrodes of neighboring single batteries are welded by high-frequency pulses;
There are insulating strips that separate electrodes between neighboring single batteries;
The insulating strips are pasted between neighboring single batteries.
There is a hook 21 on the shell.
There is a hinge joint part 22 on the back or front of the shell; and the hook is connected to the hinge joint part and the shell.

The hinge joint part is a spindle:

The spindle and the hook are connected by any of the following means:

(1) The spindle is connected to the root of the hook through a cardan joint;

(2) There is a jack socket in the middle section of the spindle (the axis of the jack socket is vertical to the axis of the spindle), the root of the hook is inserted into the jack socket, and the root of the hook can rotate in the jack socket;

(3) There is a connecting piece in the middle section of the spindle (the axis of the jack socket is vertical to the axis of the spindle), and the connecting piece and the spindle form a T-shape part; there is a jack socket at the end of the connecting piece, the root of the hook is inserted into the jack socket, and the root of the hook can rotate in the jack socket.

As there is a limit part at the external interface of the jack socket, the root of the hook will not fall out from the jack socket. The limit part may be a cap screw with a through-hole.

There is a clear sunk part 13 used to contain the folded hook on the front or back of the shell, and the clear sunk part and the hinge joint part are on the front or back at the same time. The clear sunk park is a square sunk part. After the hook is folded, it is stored in the clear sunk part, so that it will not extrude when it is not in use, for the sake of beauty.

There is a front-end LED lamp 20 on the front-end of the shell of the car jump starter power bank; the front-end LED lamp is a round lamp, and there is the first button on the shell as a switch controlling the front-end LED lamp.

There is a strip light on the front or back of the shell.

The LED lamps in the strip light include multiple three-color lamps, showing various colors. Or, the LED lamps in the strip light include a blue LED lamp, a red LED lamp and a white LED lamp. There is the second button 16 on the shell as a switch controlling the strip light.

There is also a suspension loop 19 on the shell. To be specific, the suspension loop is on the upper side.

There is a car ignition output end on the shell, and there is an ignition end cap 17 at the car ignition output end for the purpose of protection.

There is an electric quantity indicator on the shell, which is an electric quantity indication module comprised of an LED display or multiple LED lamps.

There is a 2-way USB output end on the shell.

There are lithium-ion batteries and a constant current charging circuit that is used for charging the lithium-ion batteries inside the shell.

There is a mainboard inside the shell, and there is an LED constant current driving circuit that is used for charging the LED lamps.

Here is a description about the LED constant current driving circuit:

It adopts PWM to control the luminance of the LED string lights via an NMOS tube (light regulation);

NMOS tube SE2300

The positive electrode of the LED string light is connected with the direct voltage end Vout via resistor R22, and the negative electrode of the LED string light is connected with electrode D of NMOS tube Q1; electrode S of NMOS tube Q1 is earthed; electrode G of NMOS tube Q1 is connected with the DOP3 end via resistor R20, and the DOP3 end is the IO end of MCU. Electrode G and electrode S of NMOS tube Q1 are bridged by resistor R27. This kind of light regulation circuit has a simple structure, is easy to implement, and is quite effective in light regulation.

What is claimed is:

1. A car jump starter power bank, comprising:
    a shell:
    a control circuit disposed within the shell, wherein the control circuit controls a charging process for rechargeable batteries;
    a battery pack disposed within the shell wherein the battery pack has a plurality of series-wound batteries, each battery having a positive battery electrode and a negative battery electrode;
    a charging circuit disposed within the shell, wherein the charging circuit charges the battery pack, and wherein said charging circuit further comprises a constant voltage driver chip and a current feedback circuit for setting and outputting a constant charging current further comprising:
        a voltage output end of the constant voltage driver chip is a positive output end VOUT+ of the constant current charging circuit;
        a negative output end of the constant voltage driver chip is earthed;
        power for the constant voltage driver chip is supplied by a direct current voltage power supply having ends VIN+ and VIN−;
        the current feedback circuit comprises a first resistor R1, a second resistor R2 and a fifth resistor R5, a feedback smoothing capacitor C3, as well as a reference voltage end VREF+;
        the reference voltage end VREF+ is earthed through the first resistor R1, the second resistor R2 and the fifth resistor R5 that are connected in series;
        a first connection point between the fifth resistor R5 and the second resistor R2 is a negative output end VOUT− of the constant current charging circuit;
        a second connection point between the first resistor R1 and the second resistor R2 is connected to a feedback end FB of the constant voltage driver chip;
        the feedback smoothing capacitor C3 is connected at a first end to the second connection point between the first resistor R1 and the second resistor R2, and the feedback smoothing capacitor C3 is connected at a second end to a second connection point of fifth resistor R5, opposite a first connection point of R5;
        a voltage feedback circuit further comprises a third resistor R3, a fourth resistor R4 and a first diode D1;
        the third resistor R3 and fourth resistor R4 are connected in series between the positive output end VOUT+ of the constant current charging circuit and a ground; and
        a third connection point between the third resistor R3 and the fourth resistor R4 is connected to a positive electrode of the first diode D1; and
        a negative electrode of the first diode D1 is connected with the feedback end FB of the constant voltage driver chip;
    an ignition circuit having an ignition interface disposed within the shell, the ignition circuit powers an ignition output of an automobile;
    an electric quantity indication module on the shell wherein the electric quantity indication module is one of an LED indicator and an LCD display;
    a positive battery pack electrode is connected to a positive output wire through a positive connection strap to the ignition interface, wherein the positive battery pack electrode is welded by high-frequency pulses to the batteries;

a negative battery pack electrode is connected to a negative output wire through a negative connection strap to the ignition interface, wherein the negative battery pack electrode is welded by high-frequency pulses to the batteries;

a plurality of connection straps connecting the batteries, wherein the plurality of connection straps are welded by high-frequency pulses to the batteries;

a plurality of compressible insulating strips are pasted to the batteries and separate the batteries and the positive battery electrode and the negative battery electrode; and a suspension loop on the shell of the car jump starter power bank.

2. The car jump starter power bank of claim 1 further comprising a hook on the shell of the car jump starter power bank.

3. The car jump starter power bank of claim 2 further comprising a hinge joint on at least one of a shell back and a shell front, wherein the hook is connected to the hinge joint and the shell.

4. The car jump starter power bank of claim 1, further comprising:

a spindle hinge joint, wherein a spindle and a hook are connected by at least one of:

a cardan joint connecting the spindle to a root of the hook;

a jack socket in a mid-section of the spindle, the root of the hook being inserted into the jack socket, and the root of the hook rotatable in the jack socket; and a connecting piece in the mid-section of the spindle, and the connecting piece and the spindle forming a T-shape having the jack socket at an end of the connecting piece, the root of the hook insertable into the jack socket, and the root of the hook rotatable in the jack socket.

5. The car jump starter power bank of claim 1 further comprising a clear sunk portion used to contain a folded hook on at least one of a shell front and a shell back, and the clear sunk portion and the folded hook are on at least one of the shell front and the shell back.

6. The car jump starter power bank of claim 1 further comprising a front-end LED lamp connected to a front-end of the shell.

* * * * *